No. 873,501. PATENTED DEC. 10, 1907.
T. L. CARBONE.
ELASTIC TIRE FOR WHEELS.
APPLICATION FILED MAY 22, 1907.

2 SHEETS—SHEET 1.

WITNESSES
David Levine
H. J. Suhrheir.

INVENTOR
Tito Livio Carbone
by Jacques Goepel
ATTORNEYS

No. 873,501. PATENTED DEC. 10, 1907.
T. L. CARBONE.
ELASTIC TIRE FOR WHEELS.
APPLICATION FILED MAY 22, 1907.

2 SHEETS—SHEET 2.

WITNESSES
INVENTOR
Tito Livio Carbone
ATTORNEYS

UNITED STATES PATENT OFFICE.

TITO LIVIO CARBONE, OF CHARLOTTENBURG, GERMANY.

ELASTIC TIRE FOR WHEELS.

No. 873,501.

Specification of Letters Patent.

Patented Dec. 10, 1907.

Application filed May 22, 1907. Serial No. 375,075.

*To all whom it may concern:*

Be it known that I, TITO LIVIO CARBONE, engineer, a citizen of the Swiss Republic, residing at Charlottenburg, near Berlin, 69 Fasanenstrasse, Germany, have invented certain new and useful Improvements in or Relating to Elastic Tires for Wheels; and I do hereby declare the following to be a full, clear, and exact description of the invention, such as will enable others skilled in the art to which it appertains to make and use the same.

This invention relates to elastic tires of the type wherein two or more inextensible spreading rings are disposed within a tubular casing of rubber, leather or similar material.

According to this invention the tubular casing is pressed from the outside against the interior of the tire by means of any desired pressure device. This forcing of the casing towards the interior can be effected from the tread surface, from the center of the wheel or even from the sides, this being done according to this invention by means of rings of variable diameter which force the corresponding portions of the casing into recesses formed in the inextensible rings.

Two constructions according to this invention are illustrated by way of example in the accompanying drawings, in which, Figures 1, 2, 5 and 6 are cross-sections through the elastic tire and Figs. 3, 4, 7 and 8 are sections at right angles to the wheel axle.

In the construction shown in Figs. 1-4 the under portion of the tubular elastic casing is forced against the recess formed in the inner spreading ring, while in the construction shown in Figs. 5-8 the outer or tread portion of the casing is forced into a recess in the outer of the two spreading rings.

As already stated, the wheel tire comprises, one, two or more suitably shaped inextensible rings $a$ $b$ disposed within a tubular casing $c$ of rubber, leather or similar material.

Figure 1:
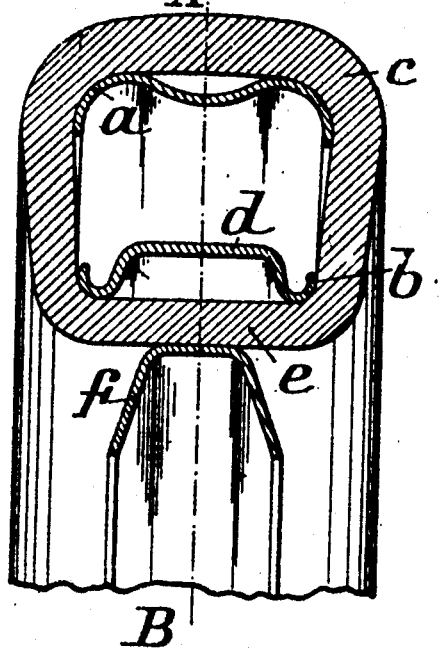
Figure 2:
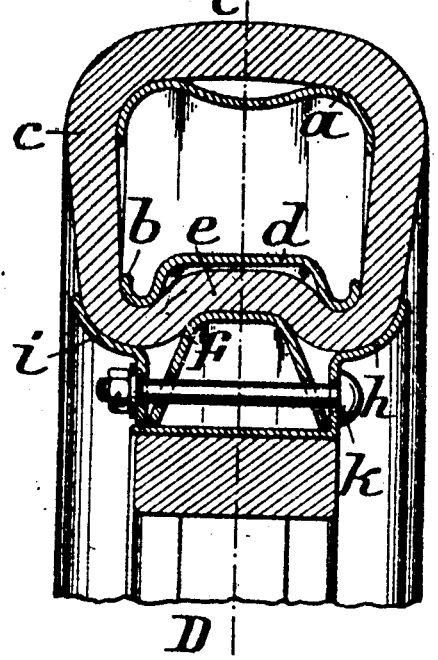
Figure 3:
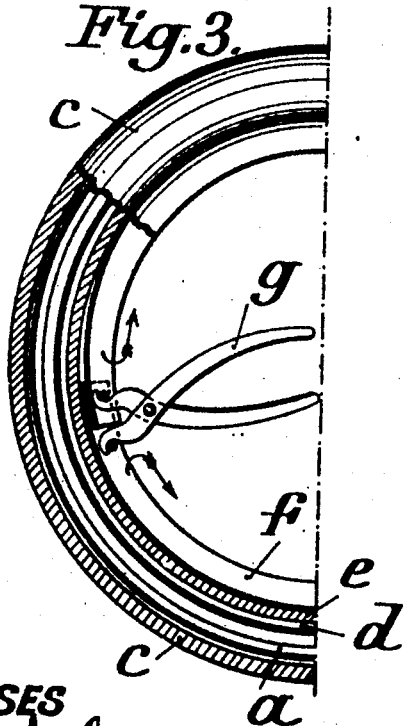
Figure 4:
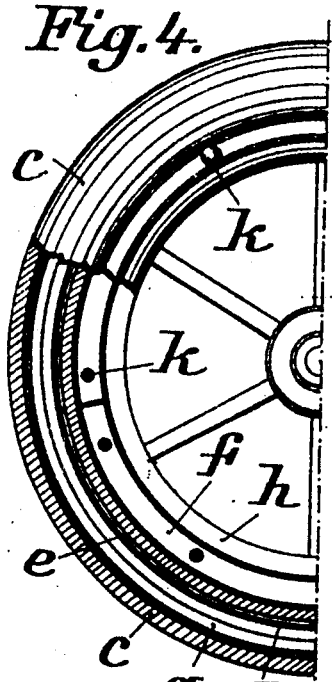
Figure 5:
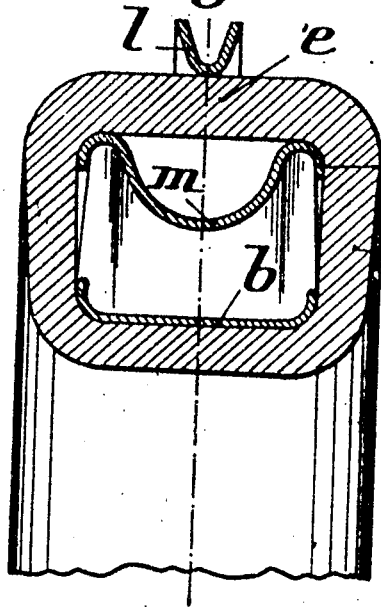
Figure 6:
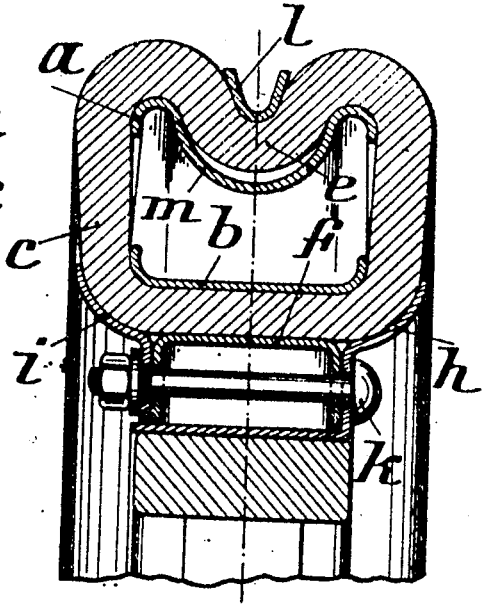
Figure 7:
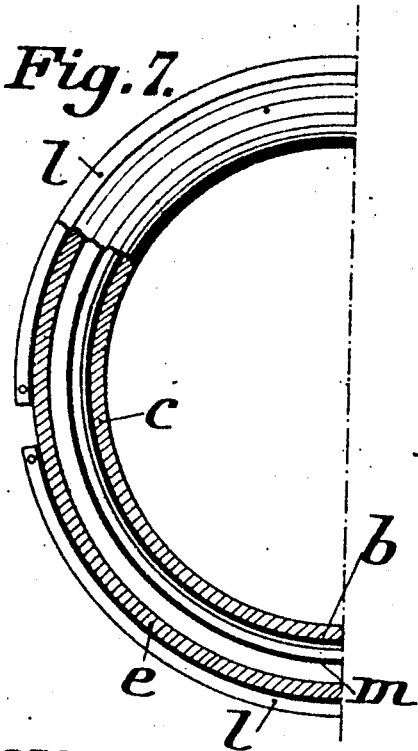
Figure 8:
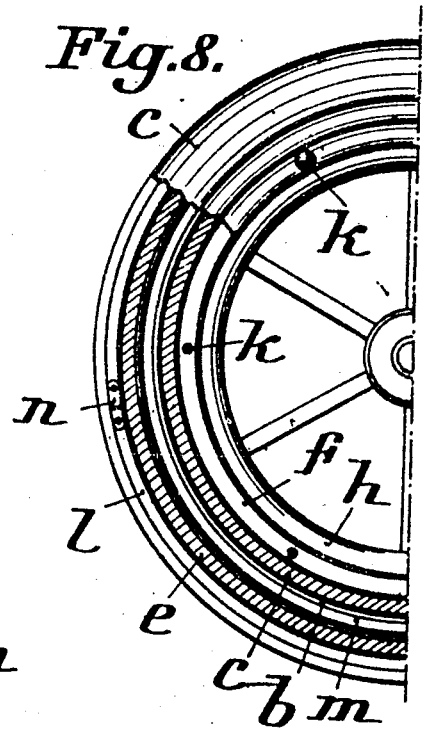

In the construction shown in Figs. 1-4 the inner ring $b$ is provided with a recess $d$ directed towards the interior of the casing, into which the under portion $e$ of the elastic casing $c$, immediately beneath it is forced by the extensible ring $f$ which acts on the underside of the casing from the outside in the manner shown in Fig. 3. The forcing in is effected, as can be seen in Fig. 3, by the two ends of the extensible ring $f$ being pressed apart by means of a scissors-like lever $g$ or some other suitable device and secured in the position by any desired locking device. After the tire has been stretched in this manner, it is, as shown by way of example in Fig. 2, pushed into the rim $h$ from which one flange has been removed whereupon the flange $i$ is attached by bolts $k$ or by other known means.

In the construction shown in Figs. 5-8 the pressure on the elastic casing $c$ is effected in such a manner that the outer or tread portion of the same is forced by a device $l$ against a recess $m$ in the outer spreading ring $a$ the recess being directed towards the center of the wheel. This device is in the present case, not pressed outwards, but compressed inwards and held in the desired position by a plate $n$.

The devices illustrated are described merely by way of example. The pressing of the elastic casing into the hollow space formed by recessing the spreading rings which it surrounds can be effected in any desired manner.

Having now particularly described and ascertained the nature of my said invention and in what manner the same is to be performed I declare that what I claim is:—

1. In elastic tires for wheels the combination with an annular tubular casing of elastic material and with inextensible spreading rings disposed within said casing of externally disposed means for forcing part of said casing inwards.

2. In elastic tires for wheels the combination with an annular tubular casing of rubber and with two inextensible spreading rings disposed within said casing, one of said spreading rings having a circumferential groove, of a third ring of variable diameter disposed externally of said casing and of means for varying the diameter of said third ring.

3. In elastic tires for wheels the combination with an annular tubular casing of rubber and with two inextensible spreading rings disposed within said casing, the inner of said spreading rings being provided on its inner side with a circumferential groove, of a ring placed inside the inner of said spreading rings and externally of the said casing, said latter ring being composed of several separate segments and of means for forcing said segments away from the center of the wheel.

4. In an elastic tire for wheels the combination with an annular tubular casing of rubber containing an outer and an inner inextensible spreading ring, the inner ring being provided with a circular groove on the side facing the center of the wheel, of a third ring placed on the inner side of the said rubber casing but externally thereof said third ring being composed of separate segments, and of an ordinary wheel having a rigid tire placed within the said segmental ring means being provided to force said segments away from the tire of the said wheel.

In testimony, that I claim the foregoing as my invention, I have signed my name in presence of two subscribing witnesses.

TITO LIVIO CARBONE.

Witnesses:
WOLDEMAR HAUPT,
HENRY HASPER.